United States Patent [19]

Ruotolo

[11] Patent Number: 5,768,138
[45] Date of Patent: Jun. 16, 1998

[54] AUTOMATIC TOOLING INSPECTION SYSTEM

[75] Inventor: Bruce Robert Ruotolo, Bloomfield, N.J.

[73] Assignee: Root Electro-Optics, Inc., East Rutherford, N.J.

[21] Appl. No.: 267,729

[22] Filed: Jun. 29, 1994

[51] Int. Cl.[6] .................. G06F 19/00; G06G 7/64; G06G 7/66
[52] U.S. Cl. .................. 364/474.28; 364/474.17; 364/474.01; 425/139
[58] Field of Search .................. 364/474.28, 474.29, 364/474.3, 474.34, 474.21, 474.35, 474.2, 476.01, 167.01; 425/139

[56] References Cited

U.S. PATENT DOCUMENTS

| | | |
|---|---|---|
| 4,570,229 | 2/1986 | Breen et al. .................. 364/476.01 |
| 4,996,898 | 3/1991 | Miller et al. .................. 83/13 |
| 5,213,818 | 5/1993 | Facchini et al. .................. 425/139 |
| 5,220,498 | 6/1993 | Ohsawa et al. .................. 364/167.01 |
| 5,255,199 | 10/1993 | Barkman et al. .................. 364/474.17 |
| 5,329,458 | 7/1994 | Unno et al. .................. 364/474.37 |
| 5,517,871 | 5/1996 | Pento .................. 73/865.9 |

*Primary Examiner*—Reba I. Elmore
*Assistant Examiner*—Sheela S. Rao
*Attorney, Agent, or Firm*—Kenyon & Kenyon

[57] ABSTRACT

A method for inspecting a tool such as a tool used in a tabletting punch and an apparatus for performing the method. The tool is clamped into a holder which positions it under an imaging device which captures an image of a top of the tool. Based an the captured image, an angular position of the tool is rotated so the tool has a predetermined angle. After the tool is rotated, an image of a profile of a tip of the tool is captured so that the radius of the tip of the tool can be determined.

9 Claims, 12 Drawing Sheets

AUTOMATIC TOOLING INSPECTION SYSTEM

BACKGROUND OF THE INVENTION

The present invention is related to an automatic tooling inspection system, and in particular, an automatic system for inspecting tools used in a pharmaceutical tabletting punch.

In the pharmaceutical industry, tabletting punches are used to compress powdered ingredients into a tablet form. Each tabletting punch includes a number of punch tool pairs, typically from 30 to 100 pairs. Determining whether the punch tool pairs of a tabletting punch fall within certain specifications is critical since the use of a faulty punch tool pair can result in unsatisfactory product (i.e., tablets). For example, irregularities in the length of the punch tools can result in either too much or too little compression of the powdered ingredients of a tablet. Imperfections in the edge of the punch tools can result tablets having an irregular shape. Nicks on the working surface of the punch tools can be infiltrated by the powdered ingredients which can either cause the tablet to stick to one of the punch tools, to be improperly compressed, or to have an improper dosage.

Therefore, inspection of punching tools is critical to ensure quality control, to ensure proper dosages, particularly in dosage critical prescriptions, and to prevent stoppages in tablet production. Inspection of the punching tools is further necessary to prevent the possibility of serious damage to expensive tablet compression machines.

In the past, punching tools were manually inspected. This method of inspection has proven to be unsatisfactory because it is inherently subjective. Further, manual inspection can only provide a low level of accuracy. Moreover, manual inspection is tedious and is an inefficient use of manpower. Therefore, there is a need for a method of inspecting punch tools which is objective, which is highly accurate, and which frees human resources.

The publication Warner Lambert: WORLD, Volume 17, No. 10 (Dec. 1987), (hereinafter "the Warner Lambert article") describes a computer aided tooling system (hereinafter "CATS") for inspecting table compression punches. CATS measures six critical punch dimensions including shank diameter and overall length. Unfortunately, it appears that CATS is not capable of inspecting punch tool edge profile or punch tool working surface integrity. Moreover, it appears that CATS employs solely mechanical means of measurement which is inherently limited.

The article, "The case for optical CMMs," Tooling & Production, pp. 73–82 (May 1989) (hereinafter "the CMM article") describes the use of optical CMMs for checking high-speed stamping presses. Unfortunately, while an optical lens can zero in on a given point or part feature with greater precision than a mechanical probe, the actual measurement is made by moving the camera and lens to particular measuring points. Therefore, the accuracy of any measurements is a function of the accuracy of the equipment which translates the tool with respect to the camera. As a consequence, expensive translation equipment is needed. Hence, there exists a need for a tool inspection system in which any inaccuracies of the translation equipment are accounted for and in which required translational motions of the tool are minimized.

In view of the disadvantages of the tool inspection techniques mentioned above, there exists a need for an automated inspection system which can inspect various punch tool dimensions and characteristics, including punch tool edge profile and punch tool working surface integrity, to a high degree of accuracy, for example, to 0.0001 inch. It is the object of the present invention to provide such an automated inspection system.

The automated inspection system should be flexible enough to permit configuration to inspect other parts which can be fixed, oriented, and gauged by cameras and sensors.

SUMMARY OF THE INVENTION

The present invention achieves the aforementioned objects by a providing a method for inspecting a tool having steps of: clamping the tool in a holder; positioning the tool under an imaging device; capturing an image of a top of the tool; orienting an angular position of the tool based on the captured image; capturing an image of a tip of the tool; and determining the radius of the tip of the tool.

The present invention implements this method by providing an automatic tooling inspection system having a tool holder, a linear translation table, a linear drive, a linear displacement measuring device, an imaging device, and a processor. The tool holder holds the tool and includes a tool rotation device for rotating the tool. The tool holder is mechanically fixed to the linear translation table. The linear drive linearly translates the linear translation table. The linear displacement measurement device measures a linear displacement of the linear translation table. The imaging device captures an image of the tool. The processor accepts the image of the tool from the imaging device and provides commands to the tool rotation device based on the captured image to orient the tool at a predetermined angle.

BRIEF DESCRIPTION OF THE DRAWINGS

FIG. 10b illustrates a perspective view of the carriage of FIG. 10a.

DETAILED DESCRIPTION

The terms listed below are used in the detailed description and are to be interpreted as follows:

Barrel Radius: The radius of a cylindrical part at its thickest cross-section.

Camera: A device for capturing an image, including but not limited to a video camera, an infrared imaging system, a charge-coupled device, or any other device performing a similar function;

Cup: A concave portion of a tool, for example, of a tool for use in a tabletting press having a contour conforming to the outer contour of a tablet;

Desired Angular Orientation: An angular orientation of a tool corresponding to the natural angle at which a human observer would read the tool's embossed features, logos, or characters. This angular orientation may also be any predetermined arbitrary orientation;

Logo: A feature, such as a product name, a trademark or company name, embossed on a tool, for example, a product name embossed on the cup of a tool for tabletting press;

Overall Length: The length of a tool from its head to its tip;

Roll-Off: A taper in a tool's profile due to wearing at the tool tip;

Tool: A machine tool in general and a punch for a tabletting press in particular;

Tool Edge Radius: The radius of a machine tool at an edge of its working surface;

Working Length: In a tabletting punch tool, the normal distance from the base of the tool to the center of the cup.

Figure 1A:
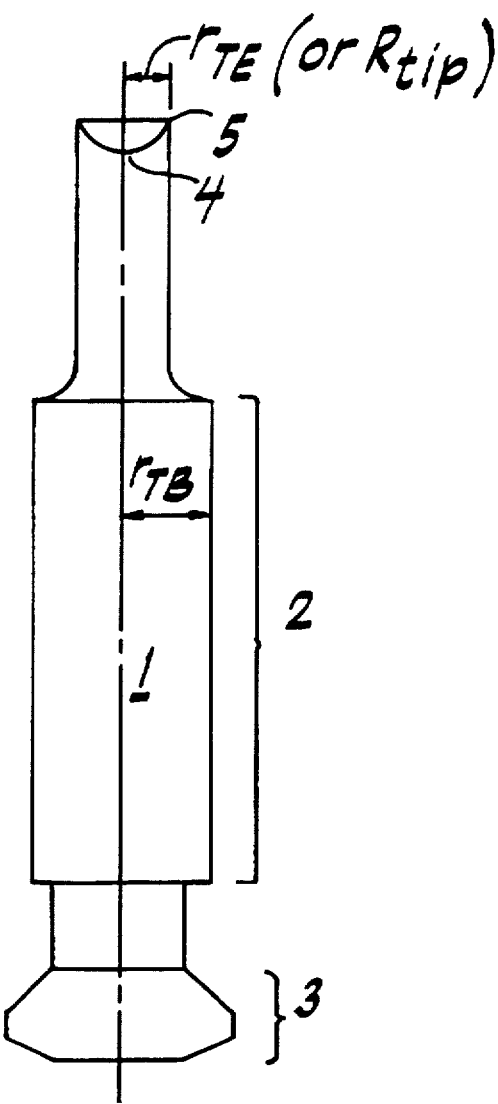
Figure 1a illustrates a partial crosssectional side view of a tabletting punch tool which is inspected by the automatic tooling inspection system of the present invention and Figure 1b illustrates a top view of the tabletting punch.

FIG. 1a illustrates a partial crosssectional side view of a tabletting punch tool 1 which is inspected by the automatic tooling inspection system of the present invention. The tabletting punch tool 1 includes a barrel section 2, a head section 3, and a concave cup section 4. The periphery of the concave section defines a tool edge 5.

Figure 1B:
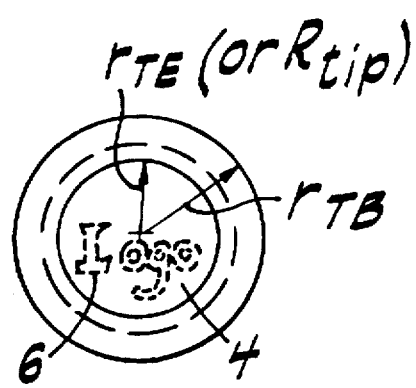

FIG. 1b illustrates a top view of the tabletting punch of FIG. 1a. A logo 6 is embossed onto the cup surface. FIG. 1a and 1b also illustrate the barrel radius $r_{TB}$ and the tool edge radius $r_{TE}$ (or tip radius $R_{tip}$) of the tool 1.

Figure 2:
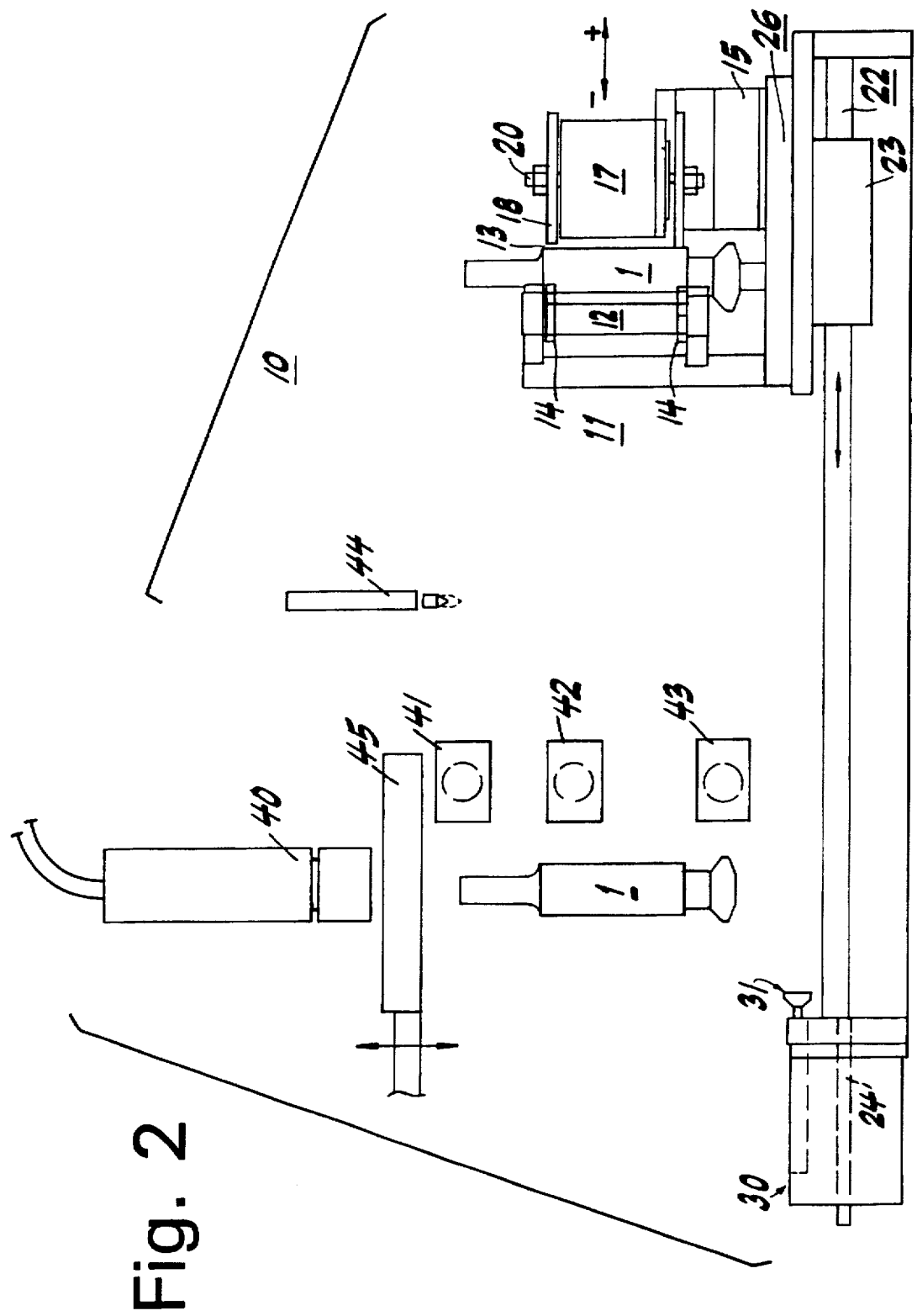
FIG. 2 illustrates the automatic tooling inspection system of the present invention.

FIG. 2 illustrates the automatic tooling inspection system 10 of the present invention. The tooling inspection system may be enclosed by a shroud (not shown) to keep out dust and other contaminates. The tool 1 is held in a precision tool holder and manipulator 11 (hereinafter "the tool holder 11"). The shroud includes a door to permit the tool holder 11 to discard an inspected tool 1 and to acquire a tool 1 to be inspected next. Air jets (not shown) may be used to blow dust and contaminates from the tool 1 and tool holder 11.

Figure 3A:
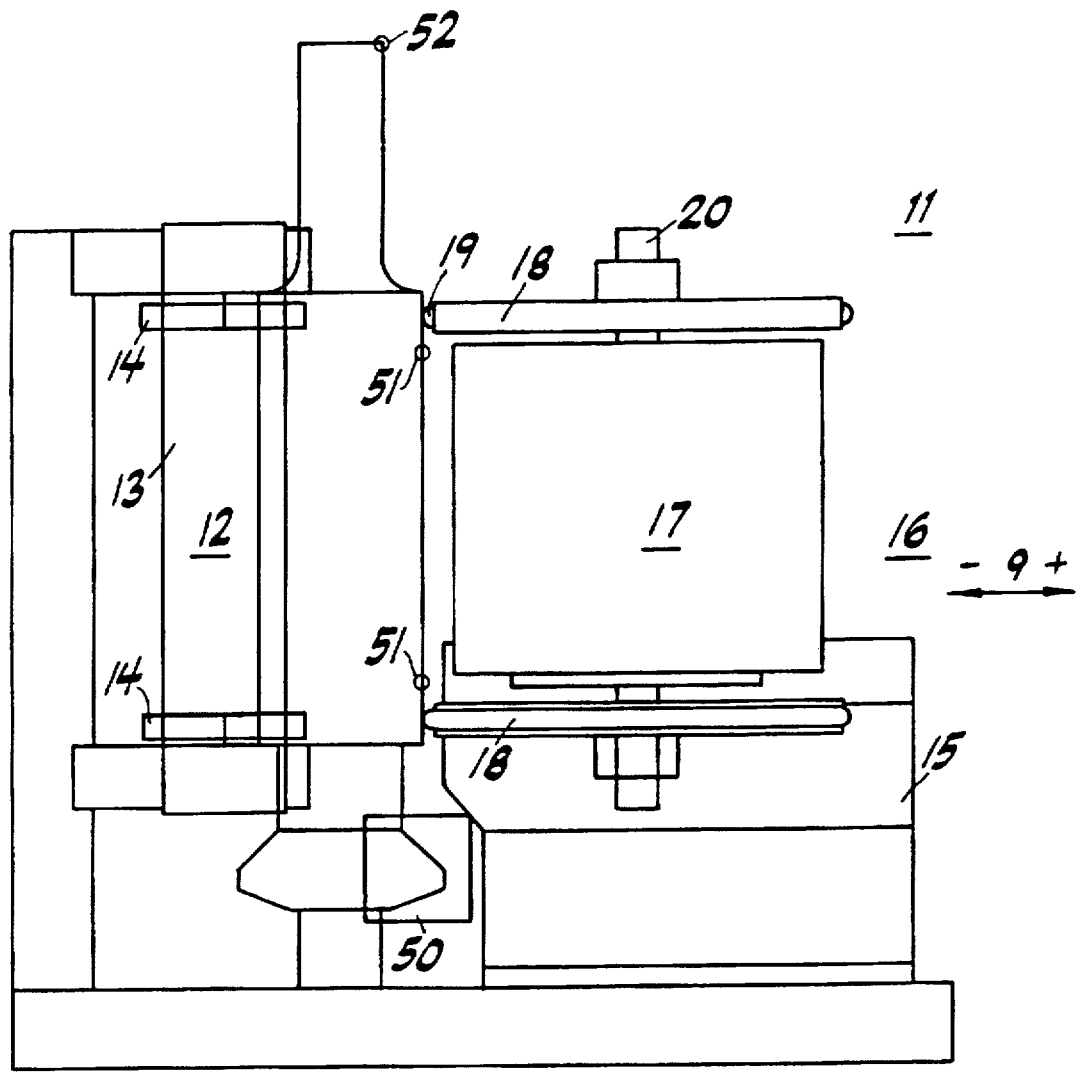
FIG. 3a is a partial cross-sectional side view which illustrates a precision tool holder and manipulator.
Figure 3B:
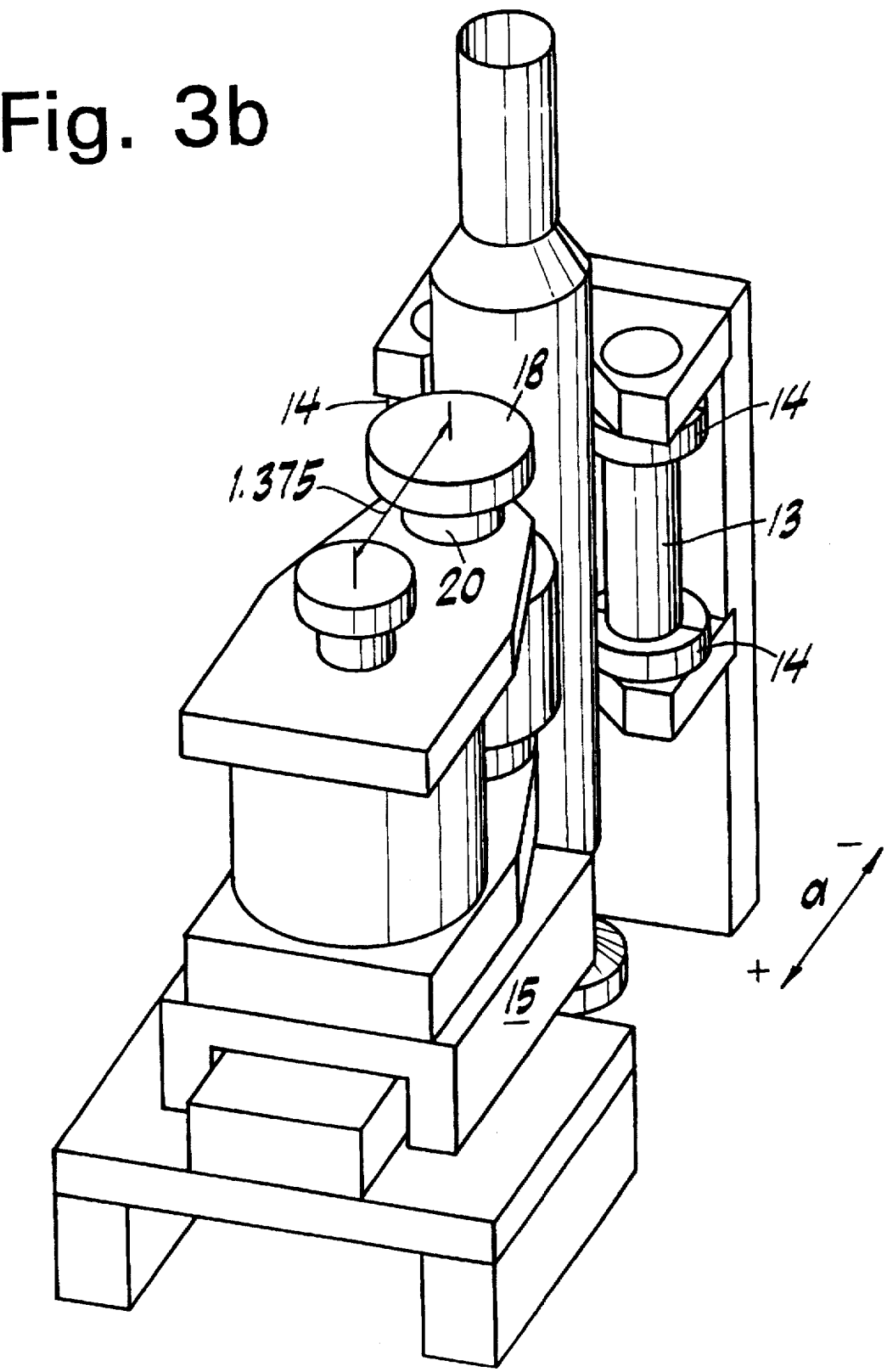
FIG. 3b is a perspective view which illustrates an alternative precision tool holder and manipulator.

Details of the tool holder 11 are shown in FIGS. 3a and 3b. The tool holder 11 includes two (2) precision cylinder bearing assemblies 12. Each of the precision cylinder bearing assemblies 12 includes a precision shaft 13 which accommodates two (2) thin section cylindrical bearings 14. The thin section cylindrical bearings 14 are preferably made from hardened steel.

While continuous cylindrical bearings could also be used, thin section cylindrical bearings 14 are preferred for two reasons. First, when thin section bearings are used, the tool 1 is held at two points. This provides a more stable grip than a continuous cylindrical bearing, particularly when the barrel 2 of the tool 1 is slightly irregular. Second, the barrel 2 of the tool 1 may have grit on it which could affect the positioning of the tool 1 with respect to the bearing assembly 12. However, thin section cylindrical bearings 14 are much less likely than a continuous bearing to contact a section of the barrel 2 having grit.

A linear actuator 15 can move a clamping assembly 16 linearly in a "+a" and a "−a" direction. The clamping assembly 16 includes a computer controlled rotary drive stepper-motor 17 which directly drives, via axis 20, two (2) drive rollers 18. Each of the drive rollers 18 is fitted with an o-ring 19. Thus, the tool 1 can be rotated by the stepper-motor 17 via the drive rollers 18.

To clamp the tool 1, the clamp assembly 16 is moved in the "−a" direction by the linear actuator 15. To unclamp the tool 1, the clamp assembly 16 is moved in the "+a" direction by the linear actuator 15. As shown in FIGS. 3a and 3b, in a "clamped" state, the tool 1 is held by the four thin section cylindrical bearings 14 of the two cylinder bearing assemblies 12, and the two o-rings 19 of the drive rollers 18.

Figure 10A:
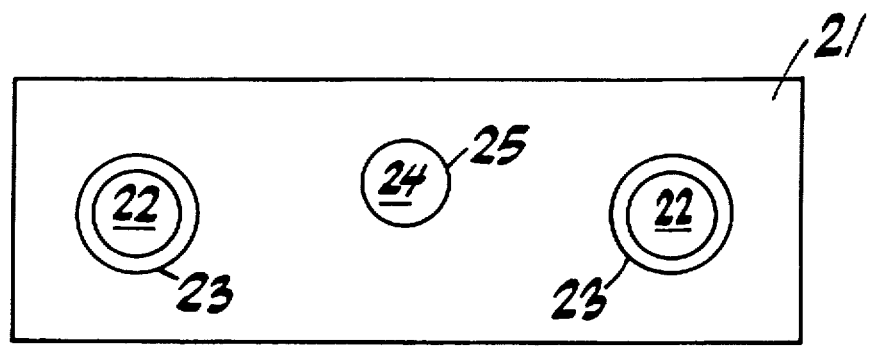
FIG. 10a illustrates an end view of a carriage for actuating a tool holder, associated rails, and a thread drive.
Figure 10B:
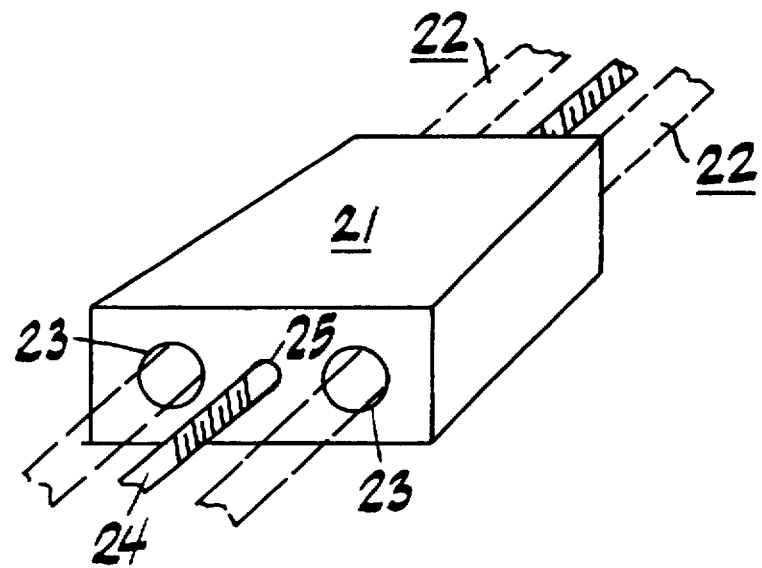

As shown in FIG. 2, the tool holder 11 is fixed to a linear translation table 26 which in turn is held on a linear translation carriage 21. As shown in FIGS. 2, 10a and 10b, the translation carriage 21 includes two longitudinal bores 23 through which two longitudinal stabilizing rails 22 pass. A further longitudinal bore 25 holds a precision threaded nut (not shown) which engages a precision threaded drive screw 24. The precision threaded nut and threaded drive screw 24 combination minimizes so called "backlash". Backlash can be thought of as a hysterisis which occurs when the direction of rotation of the threaded drive screw is changed.

The threaded drive screw 24 is driven by a motor 30. When the tool 1 is clamped into the tool holder 11, the motor rotates the threaded drive screw 24 so that the tool holder 11 is moved in the "−a" direction until it reaches the "−a" end of the rails 22.

When the tool holder 11 reaches this position, a displacement probe 31 is deployed to determine an exact position of the tool holder 11, and consequently, an exact position of the tool 1. The displacement probe 31 may be deployed either pneumatically, or electromagnetically. Since the function of the displacement probe 31 is more critical than its actual structure or mode of operation, devices performing the same function, i.e., determining the exact position of the tool 1, may be used in place of the displacement probe 31. The function of the displacement probe 31 is important however, since it compensates for residual carriage position errors, for example positional errors occurring due to "backlash" discussed above.

After the displacement probe 31 determines the position of the tool 1, a camera 40 (see FIG. 2) captures an image corresponding to the top of the tool 1. (See FIG. 1b). A processor (not shown) uses images captured by the camera 40 to determine the angular orientation of the top view of the tool 1. Based on the determined orientation, the processor issues commands to a control input of the computer controlled stepping-motor 17 to orient the top view of the tool 1 in a desired angular orientation. The steps of capturing a image of the top of the tool 1, determining an angular orientation, and orienting the top view of the tool in a desired angular orientation are repeated in an iterative manner. This process will be referred to as "exterior angle orientation". Orienting the exterior angle of the top of the tool is essential to provide a known reference point which permits repeatable profile measurements by subsequent stations.

Figure 11A:
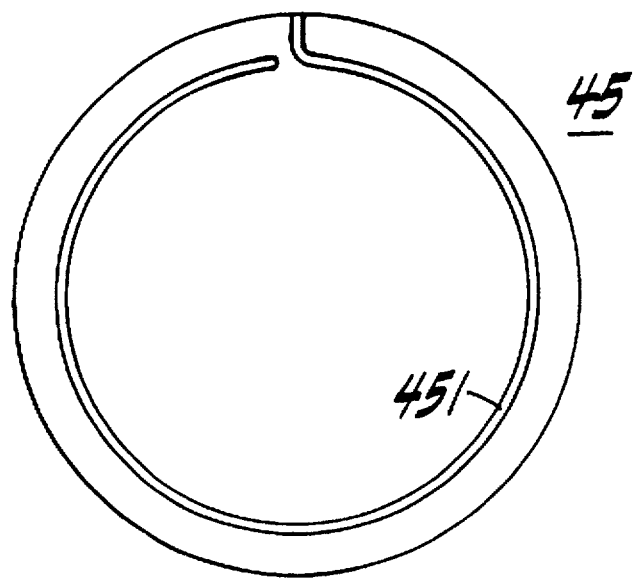
FIG. 11a is a cross-sectional top view which illustrates a fiber-optic ring light.
Figure 11B:
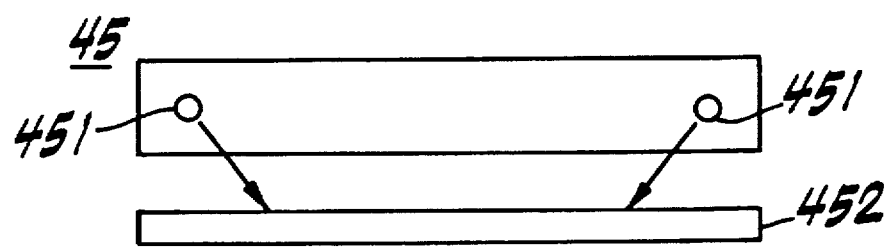
FIG. 11b is a cross-sectional side view which illustrates a fiber-optic ring light and a diffuser.

A ring light 45 is used to improve the contrast of the image captured by camera 40. As indicated in FIG. 2, the ring light 45 may be linearly translated up and down to adjust the image contrast. As shown in the top view of FIG. 11a, the ring light 45 includes a light emitting fiber optic cable 451. Ring lights or other illumination means having different structures able to perform the function of the fiberoptic ring light, i.e., able to improve the contrast of the image captured by camera 40, may be used instead. As shown in the cross sectional side view of FIG. 11b, the light is directed downward and radially inward. A diffuser 452 may be used to increase the uniformity of light emitted by the ring light 45.

Figure 4:
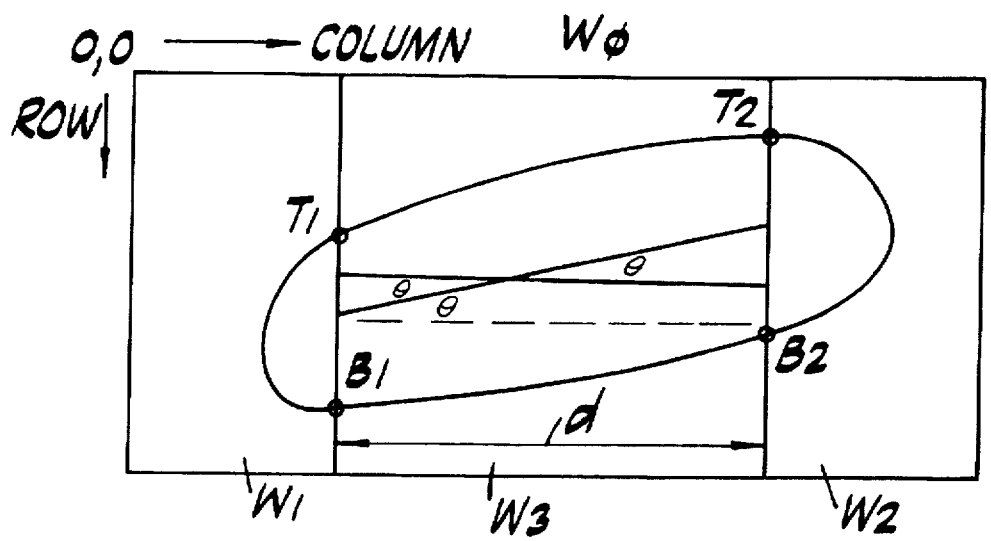
FIG. 4 is an illustration of a captured image of a top of an elliptical tabletting punch tool, which serves to illustrate a method for estimating an exterior rim orientation angle.
Figure 5A:
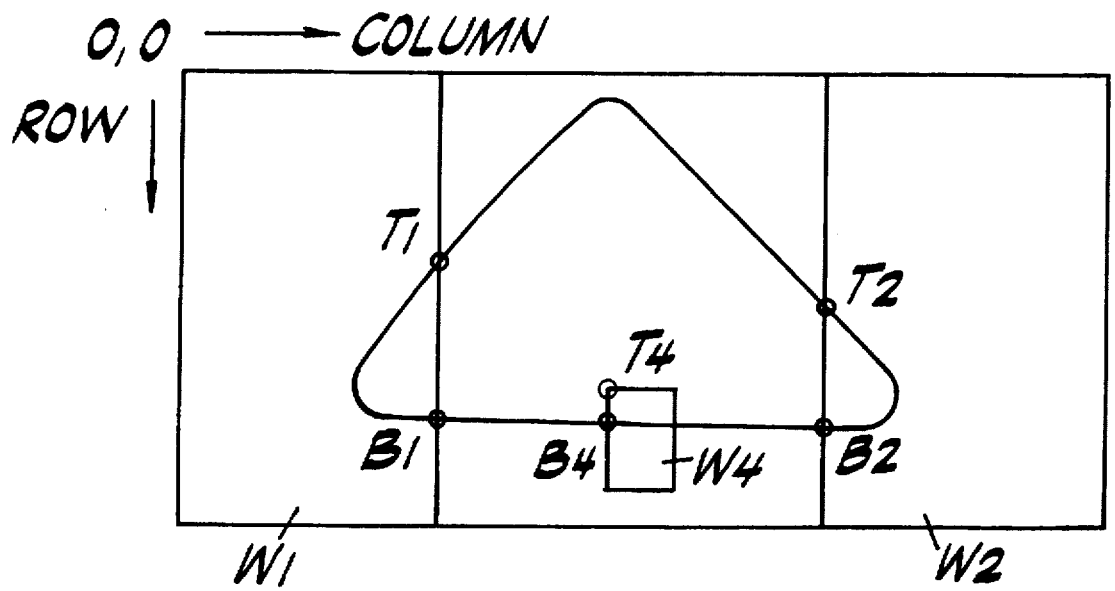
FIGS. 5a and 5b are each illustrations of a captured image of a top of an odd-number-sided tabletting punch tool, which serve to illustrate a method for estimating an exterior orientation angle.
Figure 5B:
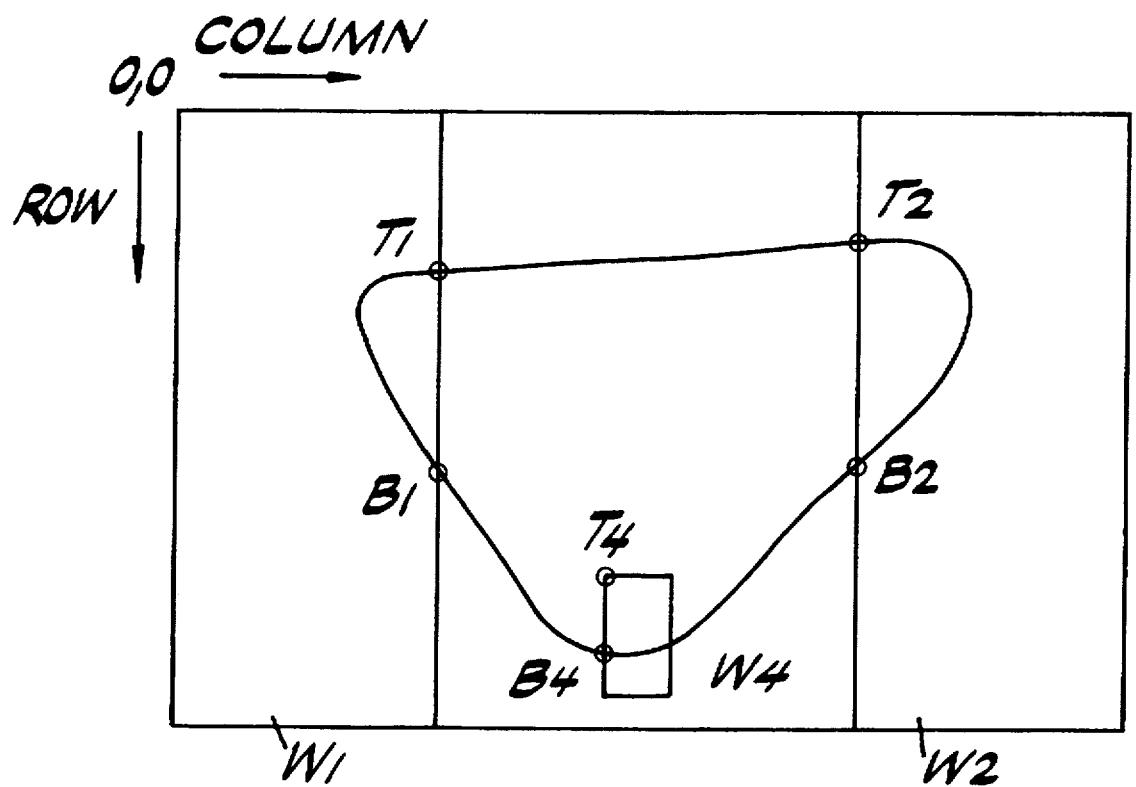

The "exterior angle orientation" process is described below referring to FIGS. 4, 5a, and 5b. FIG. 4 illustrates a captured image of the top of an elliptical tool 1. FIGS. 5a and 5b illustrate a captured image of the top of odd-numbersided tool 1.

As shown in FIG. 4, the entire image is encompassed within a window $W_0$ and includes a number of pixels. Each pixel in the window $W_0$ has a unique coordinate pair {column, row} which are referenced to the top left hand corner of the image, {0,0}. The window $W_0$ includes a left window $W_1$, a right window $W_2$, and a center window $W_3$.

The minimum and maximum rows ($T_1$ and $B_1$) of the image at the right most column of left window $W_1$ are determined in a manner known to one skilled in the art. The minimum and maximum rows ($T_2$ and $B_2$) of the image at the left most column of the right box $W_2$ are similarly determined. A distance "d" is determined by subtracting the number of the right-most column of the left window $W_1$ from the number of the left-most column of the right window $W_2$.

The angle θ from the desired orientation can be determined with the following expression:

$$\theta = \arctan \frac{1/2\,(T_2 + B_2) - 1/2\,(T_1 + B_1)}{d}$$

This procedure provides a conclusive exterior angle orientation result for tools having a top surface in the shape of an ellipse. If the shape of the top surface of the tool is 3-sided, 5-sided, 7-sided, etc., the results of the above procedure are ambiguous. For example, in FIGS. 5a and 5b, the angle θ is the same while the exterior angular orientations of the tools are clearly different. To resolve this ambiguity, an additional window $W_4$ is employed.

As illustrated in FIG. 5a, if the row number of point $B_4$ is equal the row numbers of points $B_1$ and $B_2$, the tool is properly oriented. (Note that it makes no difference whether $B_4$ is located on the left edge of the window $W_4$ or the right edge of the window $W_4$ for this purpose). If however, the row number of point $B_4$ is not equal to $B_1$ or $B_2$ as illustrated in FIG. 5b, the tool is improperly oriented. In this case, the processor issues a command to the stepper-motor 17 to rotate the tool by an angle β which is determined by the following expression:

$$\beta = \frac{360°}{2n}$$

where n is the number of sides of the top of the tool.

In either case, the angle θ is determined in the same way. Using the calculated angle θ, a processor (not shown) issues a command to the stepper-motor 17 to rotate the tool such that the angle θ is zero. The steps of capturing an image of the top of the tool, determining θ, and commanding the stepper-motor to rotate the tool to minimize θ are repeated iteratively, preferably five (5) times.

Once the "exterior angle orientation" process is complete, a "logo orientation" process is carried out. In the logo orientation, the captured image of the top of the tool, including the logo 6 is processed with a "mask" of the logo at the desired angular orientation. Such a masking process involves a simple boolean AND operation or an OR operation of the pixels of the captured image with the pixels of the logo "mask", depending upon whether a positive mask or a negative mask is used. The number of pixels having a first binary value is compared with a total number of pixels to determine whether the mask corresponds to the logo. If grey scaled images are used, the sum of the intensities for each pixel is compared with an expected sum value to determine whether the mask corresponds to the logo.

If the mask corresponds to the logo, the tool has the proper angular orientation. If the mask does not correspond to the logo, the processor issues a command to the stepper-motor 17 to rotate the tool by an angle α which is determined by the following expression:

$$\alpha = \frac{360°}{n}$$

where n is the number of sides of the top of the tool.

Figure 6:
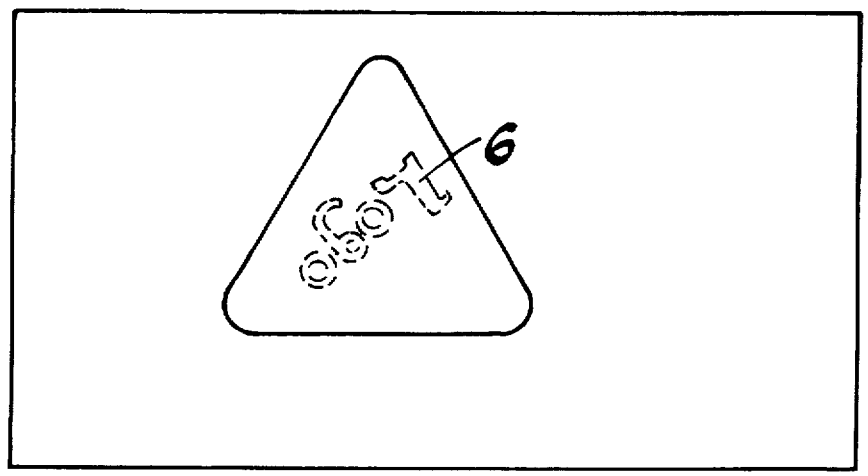
FIG. 6 is an illustration of a captured image of a top, working surface, of a tabletting punch tool which serves to illustrate a masking method for orienting an angle of the tabletting punch tool.

The masking procedure is repeated until the logo corresponds with the mask. For example, FIG. 6 illustrates a captured image of a top of a tool. This tool would have to be rotated clockwise twice, by an angle α=120° each time, before the tool 1 is properly oriented. At the end of these steps, the tool will be in the desired angular orientation, i.e., the orientation corresponding to the natural angle at which a human observer would read the tool's embossed features, logos, or characters.

Figure 9A:
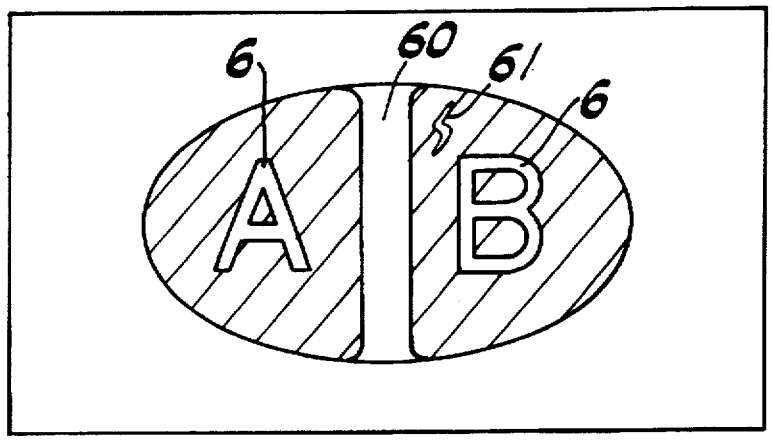
FIGS. 9a, 9b, and 9c illustrate a method of detecting defects on the working surface of a tabletting punch tool.
Figure 9B:
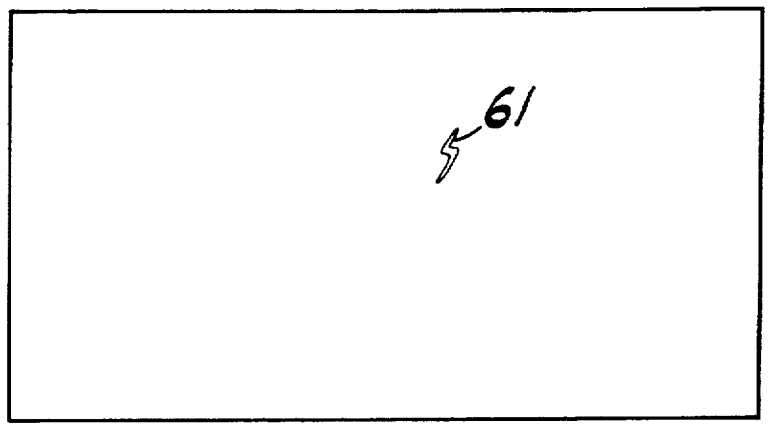
Figure 9C:
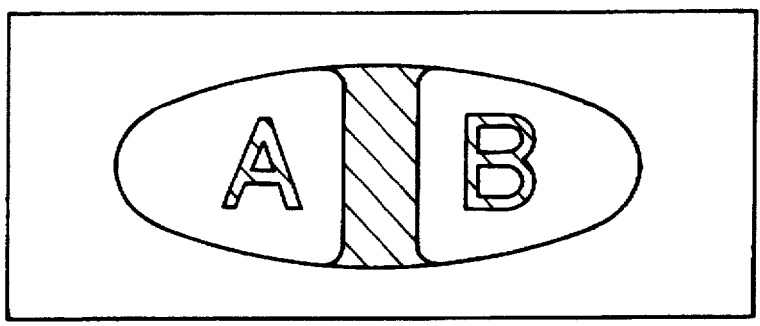

A defect detection step may also be performed at this point. FIG. 9a depicts a captured image of a top view of the working surface of a tool 1. The logo 6, the tablet indentation surface 60, and defects, such as a nick 61, are captured as white images on a dark field. (The inverse may also be true). A defect mask (see FIG. 9c) or negative image of known features (i.e., the logo 6 and the tablet indentation surface 60) is added to the image and is used to "block" known features. This is accomplished by performing a binary operation on the pixels of the captured image and the pixels of the defect mask in a known manner. The result of adding the captured image and the defect mask is illustrated in FIG. 9b. As shown in FIG. 9b, the image of the defect 61 remains when the captured image is added to the defect mask. The image of the defect 61 can be detected manually by viewing a monitor, not shown, or automatically by determining the number of "white" pixels.

Referring to FIGS. 2 and 3a, the gauge and profile of the barrel 2 is inspected. The camera 42 of FIG. 2 has a microscope lens and inspects the barrel 2 of the tool 1. Due to the microscope lens of the camera 42, the field-of-view, shown by area 51 of FIG. 3a, is relatively small. Light sources (not shown) backlight the tool 1 with respect to the camera 42. Further, a processor (not shown) issues commands to the stepper motor 17 to rotate the tool 1 to permit multiple profile sampling which is optimized to detect wear or determine tool diameters and gauge points at predetermined angles of significance. Tool barrel radius and ellipticity are determined from these profile samples. The tool barrel diameter can be derived by converting a high resolution video image while accounting for the rotary mechanism bearing geometry. If barrel taper is of interest, tool barrel radius may be measured at two or more heights.

The gauge and profile of the head 3 of the tool 1 can be similarly inspected employing a processor (not shown)

which issues commands to the stepper motor 17 to rotate the tool 1 to permit multiple profile sampling which is optimized to detect wear or determine tool diameters and gauge points at predetermined angles of significance. The camera 43 of FIG. 2 has a short focal length lens and inspects the head 3 of the tool 1. Due to the short focal length of the camera 43, the field-of-view, shown by area 50 of FIG. 3a, is relatively large. Light sources (not shown) backlight the tool 1 with respect to the camera 43. The head 3 of the tool 1 can be inspected at the same time as the barrel 2 of the tool 1. The data from the camera 43 focused on the head 3 of the tool 1 and the data from the camera 42 focused on the barrel 2 of the tool 1 may be processed in parallel.

The tip of the tool 1 is inspected next with the camera 41 which also has a microscope lens. Due to the microscope lens of the camera 41, the field-of-view, shown by the area 52 of FIG. 3a, is relatively small. Light sources (not shown) backlight the tool 1 with respect to the camera 41. When tools having tips with round, elliptical, or regular polygonal shapes, linear motion is automatically calculated by the processor to simplify the inspection of these tool tips.

Based on the image captured by the camera 41, the radius of the tip $R_{tip}$ (or the tool edge radius $r_{TE}$) is determined in accordance with the following relationship:

$R_{tip}$ = (scale * pixels) = OFFSET + BARREL CENTERLINE DEVIATION + LINEAR VARIABLE DISPLACEMENT TRANSDUCER DEVIATION − DISTANCE MOVED BY CARRIAGE.

Figure 13A:
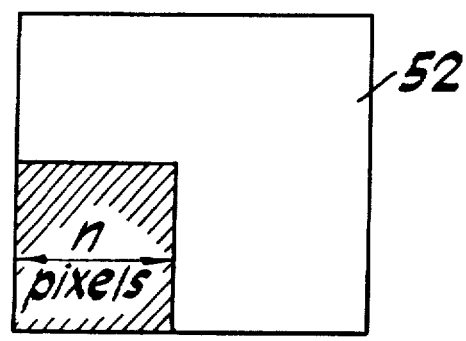
FIG. 13a illustrates a tool tip image captured by a camera.

FIG. 13a illustrates a tool tip image captured by camera 41 and is referred to for explaining the (scale * pixels) term of the above relationship. Each pixel of the image has a length and a width. The "scale" term is a conversion factor for converting pixels to a length. For example, the "scale" term may be 0.33 mils/pixel. A length is determined by multiplying the "scale" term with the number of pixels n in a row of the captured image.

Figure 13B:
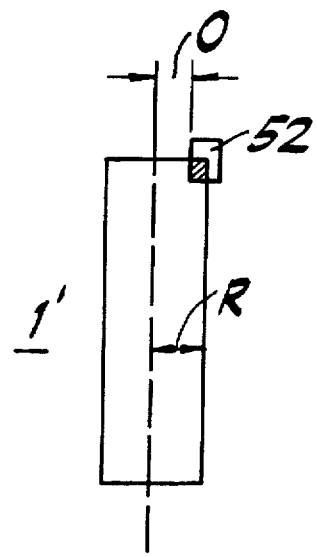
FIG. 13b illustrates a camera field-of-view with respect to a tool of known diameter.

FIG. 13b illustrates a camera 41 field-of-view with respect to a tool 1' of known diameter and is referred to for explaining the OFFSET term of the above relationship. A tool 1' of known diameter, and therefore known radius $r_{known}$, is positioned in the tip inspection position. The OFFSET value "o" is determined by subtracting the (scale * pixel) value of the image captured by camera 41 from the known radius $R_{known}$.

Figure 13C:
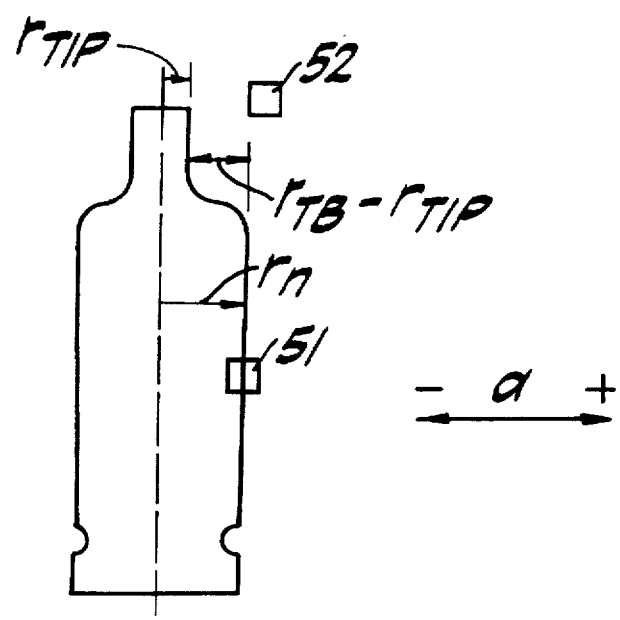
FIG. 13c illustrates the distance a tool must be moved after its barrel radius is inspected so that its tip radius may be inspected.

As illustrated in FIG. 13c, after the barrel diameter of the tool 1 is determined with an image from window 51 (field-of-view) captured by camera 42, the tool 1 must be moved in the "+a" direction to bring the tip of the tool 1 into the window 52 (filed-of-view) of the camera 41. The distance of this movement is the difference between the expected radius of the barrel of the tool 1 and the expected radius of the tip of the tool 1. (This assumes that cameras 41–43 are aligned.) The carriage 21 of the holder 11 is moved this distance by the drive screw 25 which is rotated by processor controlled motor 30.

Figure 7:
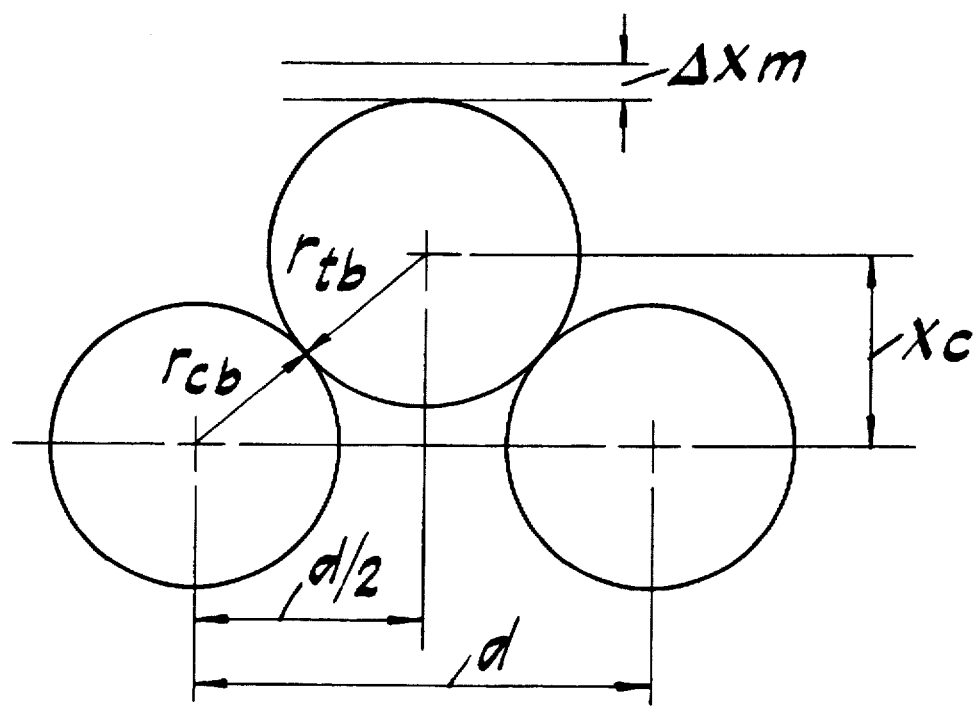
FIG. 7 is a diagram which illustrates a method for determining a centerline of a tabletting punch tool.

The BARREL CENTERLINE DEVIATION term ($\Delta X_C$) is related to the radius of the tool based on the geometry of the cylindrical bearing tool holder. Referring to FIG. 7, the barrel centerline $X_C$ can be determined by the following relationship:

$$X_C = \sqrt{(r_{cb} + r_{tb})^2 - \left(\frac{d}{2}\right)^2}$$

where: d = separation of the cylindrical bearing centerline;
$r_{cb}$ = cylindrical bearing radius; and
$r_{tb}$ = tool barrel radius.

For example, if a one inch diameter tool is used, if the cylindrical bearings have a one inch diameter, and if d is √2 inches, $$X_C = \sqrt{1 - \frac{1}{2}} = 0.7071$$

If the radius of the tool changes by just 0.001 inch, the barrel centerline deviation will be 0.001415 inch, as illustrated below.

$$X_C = \sqrt{(0.999)^2 - 0.5} = .70569$$

$\alpha X_C = 0.7071 - 0.70569 = 0.001415$
Therefore, for a one inch tool, $$\frac{\Delta X_C}{\Delta r_{tb}} \cong 1.4$$

This relationship becomes exaggerated for tools having smaller diameters. For example, if a tool having a 0.75 inch diameter is used, if the cylindrical bearings have a one inch diameter, and if d is √2 inches, $$X_C = \sqrt{(0.875)^2 - 0.5} = 0.51539$$

If the barrel radius of the tool changes by just 0.001 inch, the barrel centerline deviation will be 0.0017 inch, as illustrated below.

$$X_C = \sqrt{0.874^2 - 0.5} = 0.51369$$

$\Delta X_C = 0.51539 - 0.51369 = 0.00170$
Therefore, for a 0.75 inch tool, $$\frac{\Delta X_C}{\Delta r_{tb}} = 1.7$$

A change in the "measured" value of the barrel by a camera ($\Delta X_m$) can be determined from the change in the tool barrel radius $r_{tb}$ as follows:

$\Delta X_M = \Delta r_{tb} - \Delta X_C$

Therefore, for a one inch tool, $\Delta X_m \Delta r_{tb} + 1.4 \Delta r_{tb} = 2.4 \Delta r_{tb}$ Similarly, for a 0.75 inch tool, $\Delta X_m = 2.7 \Delta r_{tb}$ The LINEAR VARIABLE DISPLACEMENT TRANSDUCER DEVIATION term represents an arbitrary change in the position of the holder 11 from run to run. Such changes in the position of the holder 11 can be caused by an electrical glitch, a mis-step in the motor 30, a momentary power failure, or grit in the screw drive 25, for example. The source of the deviation however is not important, as long as the deviation is taken into account when determining the radius of the tip, $R_{tip}$. This deviation is determined by the displacement probe 31.

Figure 12A:
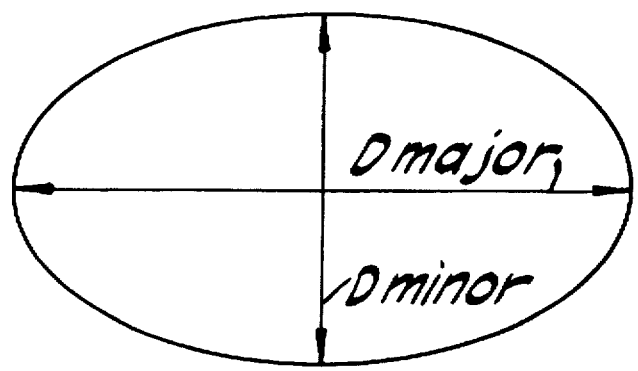
FIG. 12a illustrates the major and minor axes of an ellipse.
Figure 12B:
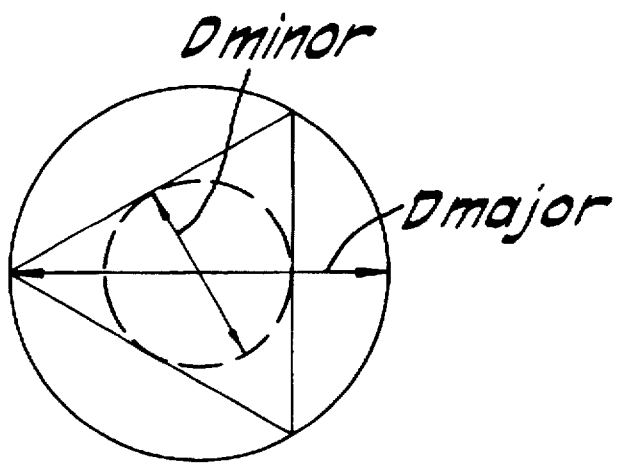
FIG. 12b illustrates the major and minor axes of a triangle.

The tool 1 is further translated and rotated to complete the profile inspection of edges located beyond the field-of-view of the cameras 41. For example, as illustrated in FIG. 12a, an elliptical tablet tool may require two (2) measurements of profile to determine the major diameter (i.e., at 0 degrees and 180 degrees) and two (2) measurements of profile to determine the minor diameter profile (i.e., at 90 degrees and 270 degrees). Similarly, as illustrated in FIG. 12b, a triangular tool would require three (3) measurements to determine the major radius and three (3) measurements to determine the minor radius. As can be gathered from these examples, the number of profile measurements required is reduced to one (1) for round tool tips and is increased beyond two (2) for tools having widely varying tip radius compared with the field-of-view of the cameras 41.

Figure 8A:
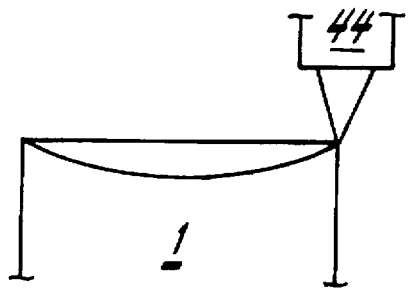
FIG. 8a is an illustration of a side view of a displacement probe with respect to the top portion of a tabletting punch tool.
Figure 8B:
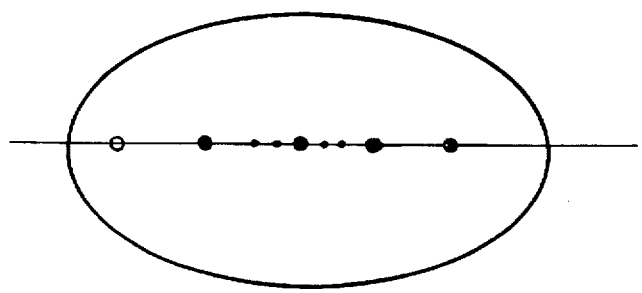
FIG. 8b is a diagram which illustrates a sampling path of the displacement probe.

After the inspection by the cameras 41, 42, and 43, the oriented tool 1 is translated by means of the motor 30 and linear drive screw 24 until its working surface is positioned under a displacement probe 44 (see FIGS. 2 and 8a). The displacement probe 44 measures the vertical height of the tool 1 at multiple sampling points on the working surface of the tool 1 along a line which passes through the center line of the tool 1. As was the case with the displacement probe 31 described above, the displacement probe 44 may be deployed either pneumatically or electro-magnetically. As shown in FIG. 8b, the displacement probe 44 preferably takes an odd number of samples and in particular, may take more samples per length (i.e., a higher sample density) towards the center of the working surface of the tool. From these samples, overall tool height, "cup" profile (or cup depth), and the height of key features, such as an embossed logo 6, can be determined. The tool 1 may also be rotated by the stepper motor 17 to obtain a number of samples at a given radius, and repeated at different radii, thereby providing series of measurements at a series of concentric circles. Similarly, the tool may be rotated by the stepper motor after a series of samples along a line has been taken, and repeated, thereby providing a series of samples along rays separated by an angle. Since the function of the displacement probe 44 is more critical than its structure or mode of operation, devices performing the same function, i.e., sampling the vertical height of the tool 1 at multiple points, may be used in place of the displacement probe 44.

What is claimed is:

1. An automatic system for inspecting a tool, said automatic system comprising:
   a) a tool holder, said tool holder
      i) adapted to hold the tool, and
      ii) including a tool rotation device adapted to rotate the tool;
   b) a linear translation table, said linear translation table mechanically coupled with said tool holder;
   c) a linear drive, said linear drive adapted to linearly translate said linear translation table;
   d) a linear displacement measurement device adapted to measure a linear displacement of said linear translation table;
   e) an imaging device adapted to capture an image of the tool;
   f) a processor, said processor
      i) accepting the image of the tool from said imaging device, and
      ii) providing commands to said tool rotation device, based on the image, to orient the tool at a predetermined angle; and
   g) a second imaging device adapted to capture an image of a profile of the tool, and adapted to communicate the captured image to said processor,
   wherein said processor further determines a radius of a tip of the tool based on the linear displacement of said linear translation table measured by said linear displacement measurement device and based on the image of the profile of the tool captured by the second imaging device.

2. The automatic tooling system of claim 1 wherein the determination of the radius of the tip of the tool is further based on a centerline deviation of a barrel of the tool.

3. An automatic system for inspecting a tool, said automatic system comprising:
   a) a tool holder, said tool holder
      i) adapted to hold the tool, and
      ii) including a tool rotation device adapted to rotate the tool;
   b) a linear translation table, said linear translation table mechanically coupled with said tool holder;
   c) a linear drive, said linear drive adapted to linearly translate said linear translation table;
   d) a linear displacement measurement device adapted to measure a linear displacement of said linear translation table;
   e) an imaging device adapted to capture an image of the tool;
   f) a processor, said processor
      i) accepting the image of the tool from said imaging device, and
      ii) providing commands to said tool rotation device, based on the image, to orient the tool at a predetermined angle; and
   g) a vertical displacement sample collector, said vertical displacement sample collector
      i) adapted to collect multiple samples of a profile of a cup of the tool, and
      ii) adapted to communicate said multiple samples to said processor.

4. The automatic tooling system of claim 3 wherein said vertical displacement sample collector is a probe.

5. An automatic system for inspecting a tool, said automatic system comprising:
   a) a tool holder, said tool holder
      i) adapted to hold the tool, and
      ii) including a tool rotation device adapted to rotate the tool;
   b) a linear translation table, said linear translation table mechanically coupled with said tool holder;
   c) a linear drive, said linear drive adapted to linearly translate said linear translation table;
   d) a linear displacement measurement device adapted to measure a linear displacement of said linear translation table;
   e) an imaging device adapted to capture an image of the tool;
   f) a processor, said processor
      i) accepting the image of the tool from said imaging device, and
      ii) providing commands to said tool rotation device, based on the image, to orient the tool at a predetermined angle;

g) two cylindrical bearing assemblies; and h) a tool clamping assembly, said tool clamping assembly
  i) mechanically coupled with said tool rotation device, and
  ii) adapted to actuate said tool rotation device between a first state in which the tool is held between said two cylindrical bearing assemblies and said tool rotation device and a second state.

6. The automatic system of claim 5 wherein said tool rotation device includes two drive rollers whereby when said tool rotation device is in said first state, the tool is held between the two cylindrical bearing assemblies and said two drive rollers of said tool rotation device.

7. The automatic system of claim 6 wherein each of said two drive rollers is fitted with an o-ring whereby when said tool rotation device is in said first state, the tool is held between said two cylindrical bearing assemblies and said o-rings of said drive rollers of said tool rotation device.

8. The automatic system of claim 5 wherein each of the cylindrical bearing assemblies includes a precision shaft accommodating two thin section cylindrical bearings.

9. The automatic system of claim 8 wherein each of said thin section cylindrical bearings is made of hardened steel.

\* \* \* \* \*